H. L. DOHERTY.
PROCESS OF AND APPARATUS FOR BURNING CEMENT.
APPLICATION FILED SEPT. 17, 1908.
945,307.
Patented Jan. 4, 1910.
2 SHEETS—SHEET 1.
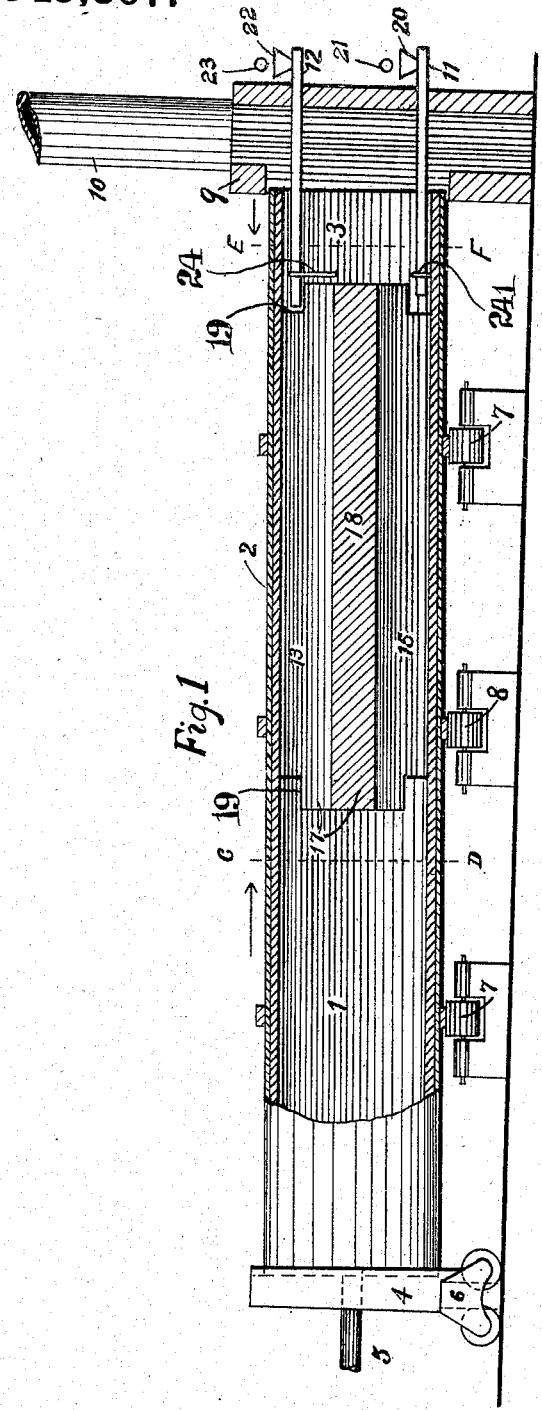
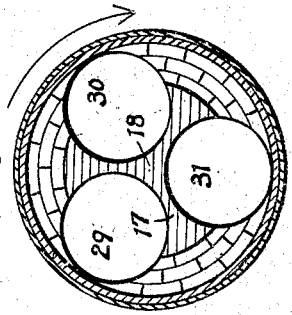
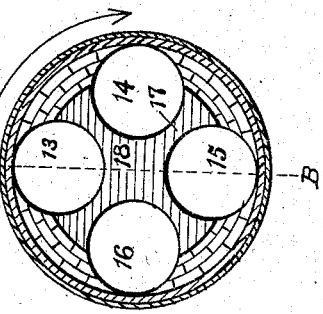
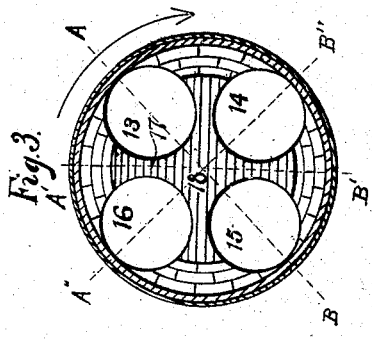
WITNESSES:
G. M. Spring
A. M. Houghton
INVENTOR
Henry L. Doherty
BY
Marble, McElroy & Matty
ATTORNEYS

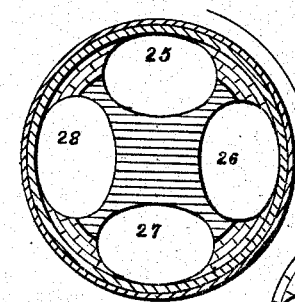
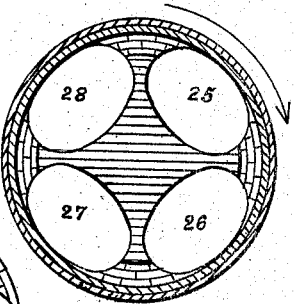
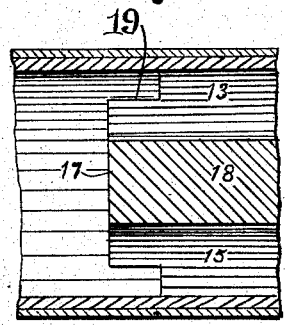
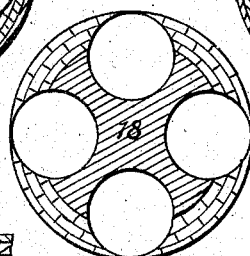
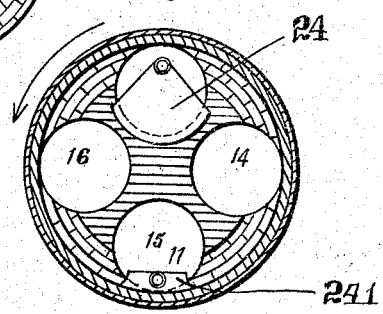
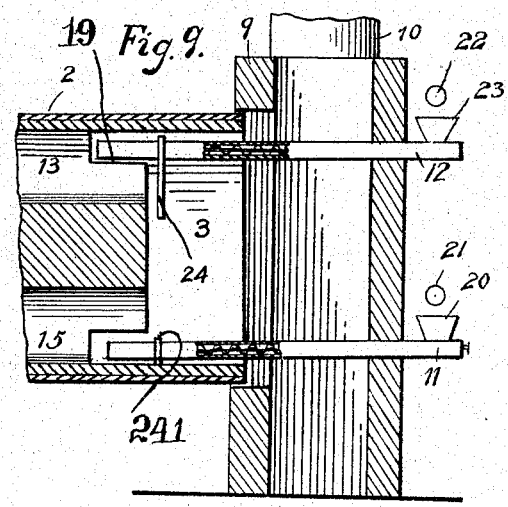

UNITED STATES PATENT OFFICE.

HENRY L. DOHERTY, OF NEW YORK, N. Y.

PROCESS OF AND APPARATUS FOR BURNING CEMENT.

945,307.    Specification of Letters Patent.    Patented Jan. 4, 1910.

Application filed September 17, 1908. Serial No. 453,381.

*To all whom it may concern:*

Be it known that I, HENRY L. DOHERTY, a citizen of the United States of America, and a resident of New York, county of New York, and State of New York, have invented a certain new and useful Process of and Apparatus for Burning Cement, of which the following is a specification.

This invention relates to processes of and apparatus for burning cement; and comprises a process of producing cement clinker in rotary kilns in which calcined cement material is exposed to the action of a flame burning in an unobstructed rotary kiln in heat radiating relationship to such calcined material and in which the hot burned gases passing from such normally developed flame are divided into a plurality of relatively small currents, each such current passing in contact with a relatively small traveling stream of cement material to be calcined; and it also comprises a cement kiln adapted for use in the operation of the described process, said kiln being a rotary device having a large unobstructed chamber of size adapted to permit the normal development of a clinkering flame therein and also having a plurality of rotatable chambers of rounded cross-section connected to said clinkering chamber and adapted to receive flame gases therefrom and discharge calcined material on the lower side thereof, said plurality of chambers together having a less cross-section than said clinkering chamber; all as more fully hereinafter set forth and as claimed.

In the method of burning cement now customary in this country, the powdered cement material, which is usually a mixture, either natural or artificial, of clay and calcium carbonate, is fed into the upper end of a long cylindrical rotating kiln and passes downward through it as a traveling stream. At the lower end of the kiln burns a flame, ordinarily a flame of powdered coal burning in aerial suspension, in heat radiating relationship to the powdered material. Under the intense heat of this flame the calcined material coming from the upper part of the kiln frits or sinters together to form what is called cement clinker, the quicklime produced from the calcium carbonate and the alumina and silica of the clay entering into reaction to produce a complex compound or plurality of compounds. This being a reaction of combination, no great amount of heat is absorbed though a high temperature is necessary to induce it. Some heat is even developed by the reaction itself. The high temperature is probably necessary to cause the clay components to soften somewhat or enter a state of incipient fusion, powders as powders rarely mutually reacting. To develop this high temperature, it is necessary to employ a concentrated or heated fuel, and usually this fuel burns as a free flame.

The flame gases passing up through the kiln are relied upon to impart heat to the cement material, disassociating the calcium carbonate to form quicklime and dehydrating the clay; two reactions customarily lumped together and called calcining in the art. Calcining while not requiring any very high degree of heat under proper conditions nevertheless absorbs a great quantity of heat, as is usual in disassociative reactions.

Here and hereinafter for the sake of simplicity of description, speaking of powdered coal as the fuel, the ideal conditions for burning cement would of course be to burn just such an amount of coal in the flame as would suffice to produce a clinkering temperature in the clinkering zone while affording enough heat units to insure the cement material reaching the clinkering zone in a completely calcined condition. This ideal is never attained. In the customary rotary cement kiln of the same diameter throughout much more coal is burned than is theoretically necessary. The kiln must be of 6 or 7 feet internal diameter, since less would not permit the proper development and situation of the clinkering flame or a sufficient output per day, the thickness of the traveling stream of cement material for various reasons being restricted to 8 or 10 inches. Greater diameter would result in the burned gases passing from the clinkering flame being spaced so far away from the material to be calcined as to have too little efficiency.

The intensely hot burned gases coming from the clinkering flame have little heat radiating efficiency in any event and as they tend to hug and follow the upper arch of the kiln in the calcining zone, passing onward as a separate upper stratum with underlying layers of the cooler air drawn in by the draft of the kiln and of the steam and carbon dioxid evolved by the calcining material on the lower arch, they do not come into actual contact with such material. Such material derives its heat largely by radiation from the hot walls and direct conduction from the portion of the wall on which it is lying; the portion which temporarily forms the floor of the rotating kiln.

It is for the stated reasons that the ordinary open cylindrical rotating cement kiln shows a poor efficiency as regards fuel consumption. It is also inefficient as a calciner, much of the original carbonate of calcium arriving under the influence of the clinkering flame, where heat radiation is intense, as carbonate and producing a sudden chilling because of the heat-absorbing evolution of carbon dioxid. This leads to rings and the formation of lumps of material containing unburned cores. The poor calcination is due not only to the inefficient heating but to the circumstances under which the kiln works. The breaking up of calcium carbonate into quick lime and carbon dioxid, like all dissociations involving the production of a gaseous phase, is much influenced by the concentration of the gaseous phase in the surrounding atmosphere; its partial pressure as this concentration is termed. At a given temperature, the rapidity of the dissociation is in an inverse ratio to the amount of carbon dioxid in the atmosphere bathing the calcium carbonate and when this amount reaches a certain maximum for each temperature, the dissociation stops. In the ordinary calcination in rotary kilns where the flame gases do not contact with the calcining material, such material is bathed in a current of carbon dioxid evolved in its own decomposition. This dioxid is comparatively cool, being formed by a heat-absorbing reaction, and heavy and it does not readily mix with the hotter and lighter gases above. This fact, taken with the poor heating efficiency in the calcining zones, explains why the ordinary rotary kiln is a comparatively poor calciner.

In the present invention, after producing the clinkering flame in a wide, open clinkering chamber as usual, permitting a full development of such flame, instead of allowing the burned flame gases to pass to the roof of the kiln 4 or 5 feet away from the material to be heated and separated therefrom by intervening layers of cooler gases and carbon dioxid, such flame gases are divided into a plurality of small streams. Each of these small streams is passed along a small traveling stream of cement material in actual heating contact therewith. Better efficiency results both because of the more efficient heating and because the carbon dioxid is diluted as fast as formed and at the place of formation. Flame gases cannot have over 20 per cent. of carbon dioxid, assuming a combustion with the theoretical amount of air; something which never takes place in practice. In practice, the flame gases do not carry over 12 to 15 per cent. In the described operation therefore, the calcining material is bathed with a gas mass containing a smaller proportion of carbon than in the ordinary kilns, and calcination is facilitated, accelerated and made more productive for the same amount of heat.

In a co-pending prior application, Sr. No. 300,323, filed Feb. 9, 1906, I have described and claimed certain apparatus capable of efficient use in the described process; said apparatus consisting of an open, wide-barreled rotary clinkering chamber of size and form suitable for the normal development of a clinkering flame therein, and connected with a plurality of smaller rounded flue-like chambers opening and discharging calcines thereinto, the plurality being mounted to revolve on the same axis as the clinkering chamber. The apparatus described and claimed in the present case presents certain improvements thereover.

The apparatus of the present invention is shown in the accompanying illustration in which—

Figure 1 is a view partly in elevation and partly in longitudinal vertical section (in line A—B of Figs. 2 and 3) of a kiln embodying such improvements; Fig. 2 is a view on a larger scale showing such a kiln provided with four cylindrical calcining flues, the view being taken on line C—D of Fig. 1, looking forward. Fig. 3 is a similar view taken after a 45° rotation of kiln from the position shown in Fig. 2; Fig. 4 is a section, similar to that of Fig. 2, of a kiln having three calcining flues; Fig. 5 is a similar section of a kiln having four elliptical calcining flues; Fig. 6 shows the positions of the subkilns after a rotation of 45° from the position shown in Fig. 5; Fig. 7 is an enlarged fragmentary vertical section showing a detail of the lower portion of the kiln at the point where the calcining flues communicate with the clinkering chamber; Fig. 8 is an enlarged vertical section of Fig. 1 along line E—F, looking toward the calcining flues; and Fig. 9 is a detail fragmental view showing both ends of the calcining flues. Fig. 10 shows a detail transverse section of the refractory internal structure of the kiln shown in Figs. 1, 2 and 3, the barrel of the kiln being omitted.

In the showing, 1 designates the clinkering chamber at the lower end of kiln 2, and 3 is a feed chamber at the upper end.

4 is a stationary housing at the lower end of the kiln and is provided with flame producing means 5 and clinker discharge 6.

7 is a bearing and 8 is a drive means.

9 is a stationary housing for the upper end of the kiln, containing the usual dust chamber and surmounted by a stack 10.

11 and 12 are conveyers for feeding raw material into the lower and upper calciners.

13, 14, 15 and 16 are calciners or calcining flues (14 and 16 being shown in Figs. 2, 3 and 8).

17 is a projecting lip or semicircular trough of a calcining flue, said flues being shown as formed in a core 18 of firebrick or other usual material and the lip formed by cutting away a portion of the outer side of each flue wall to form a jog 19. These lips 17 may be provided at both ends of the flues, as shown.

20 is a hopper feeding the conveyer to the lower calciners and deriving material from conveyer 21, while 22 is a similar hopper, fed by 23, feeding to the upper calciners.

Upon the inner end of the upper feed conveyer 12 is a deflecting plate or baffle 24 which acts to deflect upward the current of gas passing through that flue of the kiln which is at the moment uppermost, causing such current to pass to the top of the flue so that it exerts little or no influence upon the stream of raw material falling downward from the end of such chute; so avoiding the carrying back by the air current of a considerable portion of the material delivered into such upper flue by the upper conveyer. Such deflection of the air current has the further effect of throwing out from such air current, by the well known centrifugal separating action commonly utilized in centrifugal dust separators and the like, a large proportion of the dust carried by such air current. Upon the lower conveyer 11 is a similar deflector or baffle 241. Since this conveyer 11 is near the bottom of the kiln, the deflector 241 does not need to be so large as deflector 24.

The flues of the kiln may be of various shapes other than circular. In Figs. 5 and 6 I show elliptical flues, 25, 26, 27 and 28 respectively.

In the operation of the apparatus as here shown, the raw material, which is generally a mixture of clay and limestone, naturally or artificially mixed, or a mixture of iron ore, silica and limestone, is fed into the uppermost and lowermost calcining flues by the two conveyers shown, that fed into the former being deposited on the lip or semicircular trough 17. By using the pair of conveyers, the feed is made much more uniform, while the presence of the lip prevents material fed to the upper sub-kiln falling through the draft of the lower. Similarly, the lip at the lower end of the calciner prevents material from the upper subkiln being discharged into the clinkering zone until such subkiln reaches a point near the bottom.

The material fed into the subkilns travels forward therethrough as a thin stream in the manner customary in rotary kilns. In the structure shown, the subkilns rotate together about the axis of the main kiln and in so doing each in effect rotates on its own axis in the sense that its sides successively become lower and upper in spiral relationship to any given particle of material traveling therethrough.

The clinkering zone should be large and long enough to permit a normal development of the clinkering flame therein with a maximum development of heat in advance of the calcining flues. The exact dimensions will vary with the nature of the fuel and flame employed, but with a free burning flame plume of powdered coal and a 5 to 7 foot diameter of kiln, the clinkering zone may be advantageously thirty feet in length. The calcining flues may advantageously be twice as long, or sixty feet. Clinkering is performed as usual. Natural gas, producer gas, oil or coal may be employed for the flame. In the clinkering zone of a kiln, the walls are soon covered with a layer of sintered material; a phenomenon which is advantageous since such layer serves to protect the walls. Because of the comparatively small diameter of the calcining subkilns however, such a layer cannot be permitted to form therein and the clinkering temperature is therefore preferably developed well in advance of such subkilns.

It is desirable that the subkilns be of rounded section, since an angular section tends to clog and moreover lifts and drops material in lieu of allowing it to travel quietly as a stream on the bottom and lower ascending quadrant of such subkiln. With the elliptical section shown, at one point in the revolution the material is heaped and mixed somewhat, but it is not showered as in a kiln with an angular cross-section. For more purposes however the circular section is preferable. In a kiln having a clinkering chamber of say 6 feet diameter within linings and four calcining subflues of circular section, the diameter of each of these subflues may advantageously be about two feet two inches.

By the described process and in the described apparatus many advantages are gained, the production of cement being much greater per unit of fuel and the quality better than is the case in the ordinary rotary kiln. The greater production is due to the fact that the material is delivered to the clinkering flame in a more thoroughly calcined state, allowing a greater output from a given flame since such flame does not have to perform any calcination while in turn the heat of the burnt flame gases is more thoroughly utilized allowing a greater feed of material to be calcined. Such flame gases travel up through the subkilns in actual contact with the stream of material passing therethrough giving up their heat very thoroughly and diluting and carrying forward the carbon dioxid as fast as formed and from the point of formation so that such material is calcined under a low partial pressure of dioxid, which much facilitates calcination. The rotation of the subkilns carries each through the entire prism of gases coming from the clinkering chamber, facilitating an even heating.

What I claim is:—

1. The process of burning cement which comprises producing a clinkering flame in heat-conveying relationship to a traveling stream of calcined cement material, subdividing the gases from such flame into a plurality of relatively small currents, passing each such current into effective heat-radiating relationship to a relatively small traveling stream of cement material to calcine the same and maintaining such current at substantially uniform distance from such cement material during such passage and finally uniting such small streams of calcined material in proximity to the clinkering flame.

2. The process of burning cement which comprises producing a clinkering flame in an unobstructed rotary cement kiln in heat-conveying relationship to a traveling stream of calcined cement material, passing the flame gases through a plurality of smaller rotary substantially cornerless kilns in heat-conveying relationship to a plurality of streams of cement material to calcine the same and maintaining such current at substantially uniform distance from such cement material during such passage and delivering such plurality of streams to form a single stream of material in heating relationship to such clinkering flame.

3. The process of burning cement which comprises delivering cement material to a plurality of relatively small rotating substantially cornerless calcining kilns, delivering calcines from such plurality of calcining kilns into a common clinkering kiln in heat-receiving relationship to a clinkering flame, and passing the flame gases from such flame through said plurality of calcining kilns and maintaining such gases at substantially uniform distance from such cement material during such passage.

4. The process of burning cement which comprises passing cement material through a plurality of comparatively small rotating substantially cornerless calcining kilns in contact with hot flame gases as a plurality of traveling streams, uniting said streams into one stream and passing said stream into proximity with a clinkering flame, and subdividing the hot flame gases from such flame into separate currents passing through such plurality of calcining kilns and maintaining such currents at substantially uniform distances from their respective streams of cement material during the passage of such gases through said small kilns.

5. A cement kiln comprising a rotary clinkering chamber provided with flame producing means and a plurality of calcining chambers rotatable about a common axis and discharging calcines into said clinkering chamber and receiving flame gases therefrom, each of said calcining chambers being of rounded section and being provided with means preventing such discharge of calcines at an upper point in the clinkering chamber.

6. A cement kiln comprising a rotary clinkering chamber provided with flame producing means, a plurality of calcining kilns opening thereinto and rotatable on a common axis, means for feeding material into an upper calcining kiln and means for preventing such material dropping into a lower calcining kiln.

7. A cement kiln comprising a rotary clinkering chamber provided with flame producing means, a plurality of calcining kilns opening thereinto and rotatable on a common axis, means for feeding material into an upper calcining kiln, means for preventing such fed material dropping into a lower calcining kiln and means for preventing discharge of calcines into an upper portion of the clinkering chamber.

8. A rotary inclined cement kiln having an unobstructed flame chamber at its lower end and a core near its upper end, such core having a plurality of flues of rounded cross-section formed therein and having a circumferential recess at its lower end.

9. A rotary inclined cement kiln having an unobstructed flame chamber at its lower end and a core near its upper end, such core having a plurality of flues of rounded cross-section formed therein and having a circumferential recess at its upper end.

10. A rotary inclined cement kiln having an unobstructed flame chamber at its lower end and a core near its upper end, such core having a plurality of flues of rounded cross-section formed therein and having a circumferential recess at each end.

11. A rotary inclined cement kiln having near its upper end a filler forming with the walls of the kiln a plurality of flues and provided with lips to avoid showering-down of material from the upper flues through the draft-currents of the lower flues.

12. A rotary inclined cement kiln having near its upper end a filler provided with flue-openings forming sub-kilns, means for delivering material into the upper sub-kiln, and means preventing showering-down of material from said upper sub-kiln or the delivering-means therefor through the draft-currents of the lower sub-kilns.

13. A rotary inclined cement kiln having near its upper end a filler provided with flue-openings forming sub-kilns, and means for delivering material into the upper sub-kiln, said filler provided with lips preventing showering-down of material from said upper sub-kiln or the delivering-means therefor through the draft-currents of the lower sub-kilns.

14. A rotary inclined cement kiln comprising a hollow cylinder having its upper portion divided into a plurality of sub-kilns, a conveyer for delivering material into the upper sub-kiln, and a deflector in connection with said conveyer, arranged to deflect the draft current through said upper sub-kiln out of the path of the material delivered by said conveyer.

15. A rotary inclined cement kiln comprising a hollow cylinder having its upper portion divided into a plurality of sub-kilns, conveyers for delivering material into the upper and lower sub-kilns, and deflectors arranged to deflect the draft currents through said sub-kilns out of the paths of the material delivered by said conveyers.

In testimony whereof I have signed this specification in the presence of two subscribing witnesses.

HENRY L. DOHERTY.

Witnesses:
   Louis F. Musil,
   Fred. I. Smith.